(12) United States Patent
Nicholls et al.

(10) Patent No.: US 6,662,232 B1
(45) Date of Patent: Dec. 9, 2003

(54) DYNAMIC E-MAIL RE-TRANSMITTING SYSTEM HAVING TIME PARAMETERS

(75) Inventors: Timothy J. Nicholls, Standon (GB); Robert W. Allport, Harlow (GB); Stephen Kelley, Welwyn Garden City (GB); Christopher J. Capelli, Millwood, NY (US)

(73) Assignee: Pitney Bowes Ltd., Harlow (GB)

( * ) Notice: Subject to any disclaimer, the term of this patent is extended or adjusted under 35 U.S.C. 154(b) by 0 days.

(21) Appl. No.: 09/222,192

(22) Filed: Dec. 29, 1998

(51) Int. Cl.[7] .............................................. G06F 15/120
(52) U.S. Cl. ...................................... 709/246; 709/206
(58) Field of Search ................................. 709/206, 207, 709/246; 455/26.1; 704/270.1; 370/466, 412; 379/67.1, 88.22

(56) References Cited

U.S. PATENT DOCUMENTS

| | | | |
|---|---|---|---|
| 5,333,266 A | 7/1994 | Boaz et al. ................. 709/206 |
| 5,465,206 A | 11/1995 | Hilt et al. ..................... 705/40 |
| 5,479,411 A | 12/1995 | Klein ....................... 370/110.1 |
| 5,493,692 A | 2/1996 | Theimer et al. ............ 455/26.1 |
| 5,508,817 A | 4/1996 | Kunigame ................... 358/402 |
| 5,608,786 A | 3/1997 | Gordon et al. .............. 379/100 |
| 5,627,764 A | 5/1997 | Schutzman et al. ..... 364/514 R |
| 5,675,507 A | 10/1997 | Bobo, II ..................... 709/206 |
| 5,689,642 A | 11/1997 | Harkins et al. ............. 709/207 |
| 5,825,865 A | 10/1998 | Oberlander et al. ........ 379/211 |
| 5,872,926 A | 2/1999 | Levac et al. ........... 395/200.36 |
| 5,884,262 A | 3/1999 | Wise et al. .............. 704/270.1 |
| 6,157,924 A | 12/2000 | Austin ......................... 707/10 |
| 2002/0061091 A1 * | 5/2002 | Maruyama et al. ........ 379/67.1 |
| 2002/0181496 A1 * | 12/2002 | Narasimhan et al. ....... 370/466 |

FOREIGN PATENT DOCUMENTS

EP        WO 98 58491        12/1998

OTHER PUBLICATIONS

M. Jander, "Unified Messaging One–for–All Mail Call", Data Communications, US, McGraw Hill, NY, vol. 27, No. 8, May 21, 1998, pp. 78–88, XP000755589, ISSN: 0363–6399.

* cited by examiner

Primary Examiner—Le Hien Luu
(74) Attorney, Agent, or Firm—Christopher J. Capelli; Angelo N. Chaclas; Charles R. Malandra, Jr.

(57) ABSTRACT

The invention relates to a system and method for re-transmitting an e-mail message transmitted from a sender to a recipient based upon predetermined criteria. The method performing the steps of prescribing at least one time period for performing messaging tasks and defining messaging tasks to be initiated for the e-mail message during the at least one prescribed time period. When an e-mail message is received in a recipients e-mail account a determination is made as to whether if the e-mail message was received within the at least one prescribed time period. And re-transmitting the e-mail message in accordance with the defined messaging tasks if the e-mail message was determined to be received within the prescribed time period.

10 Claims, 11 Drawing Sheets

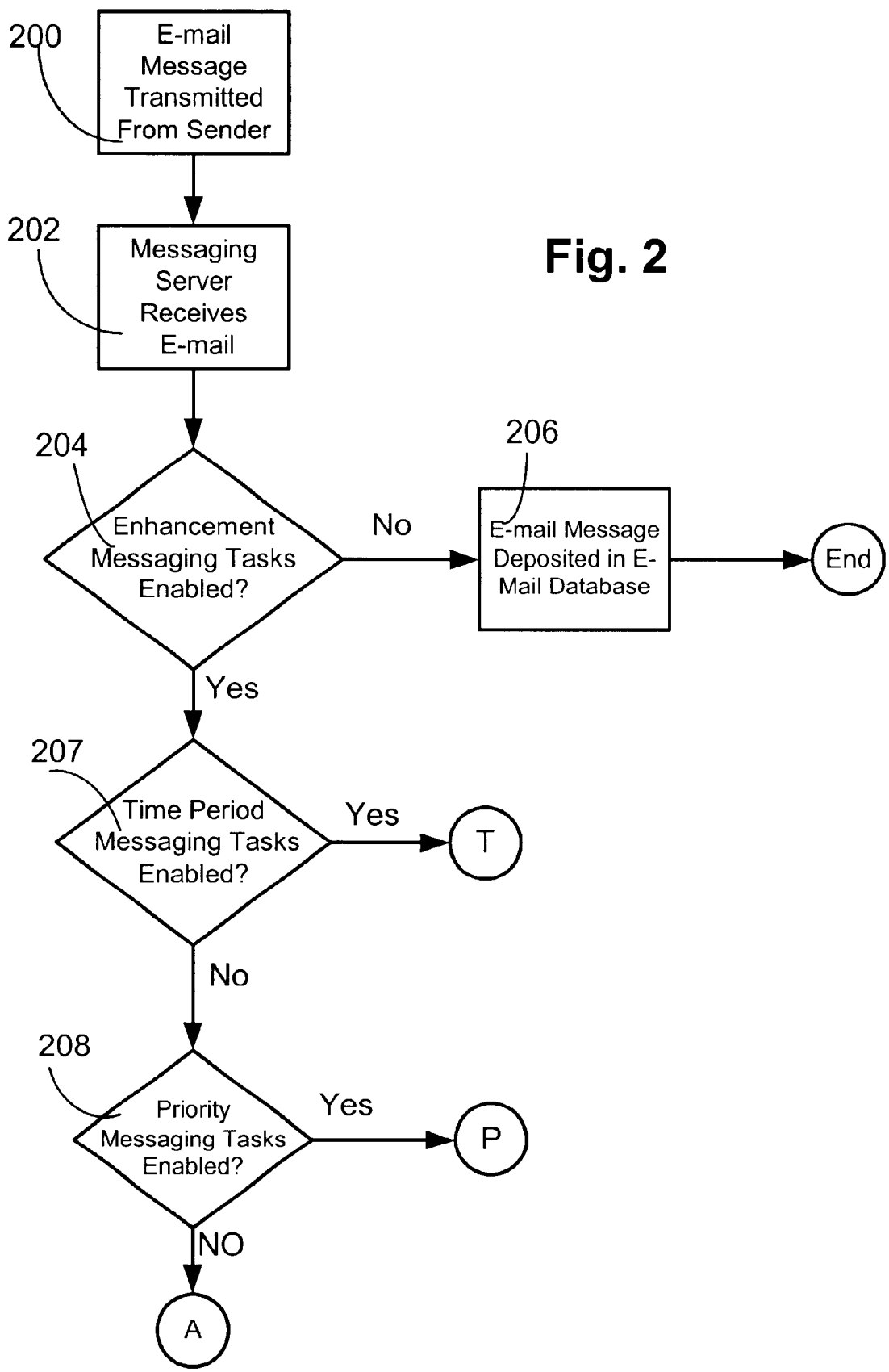

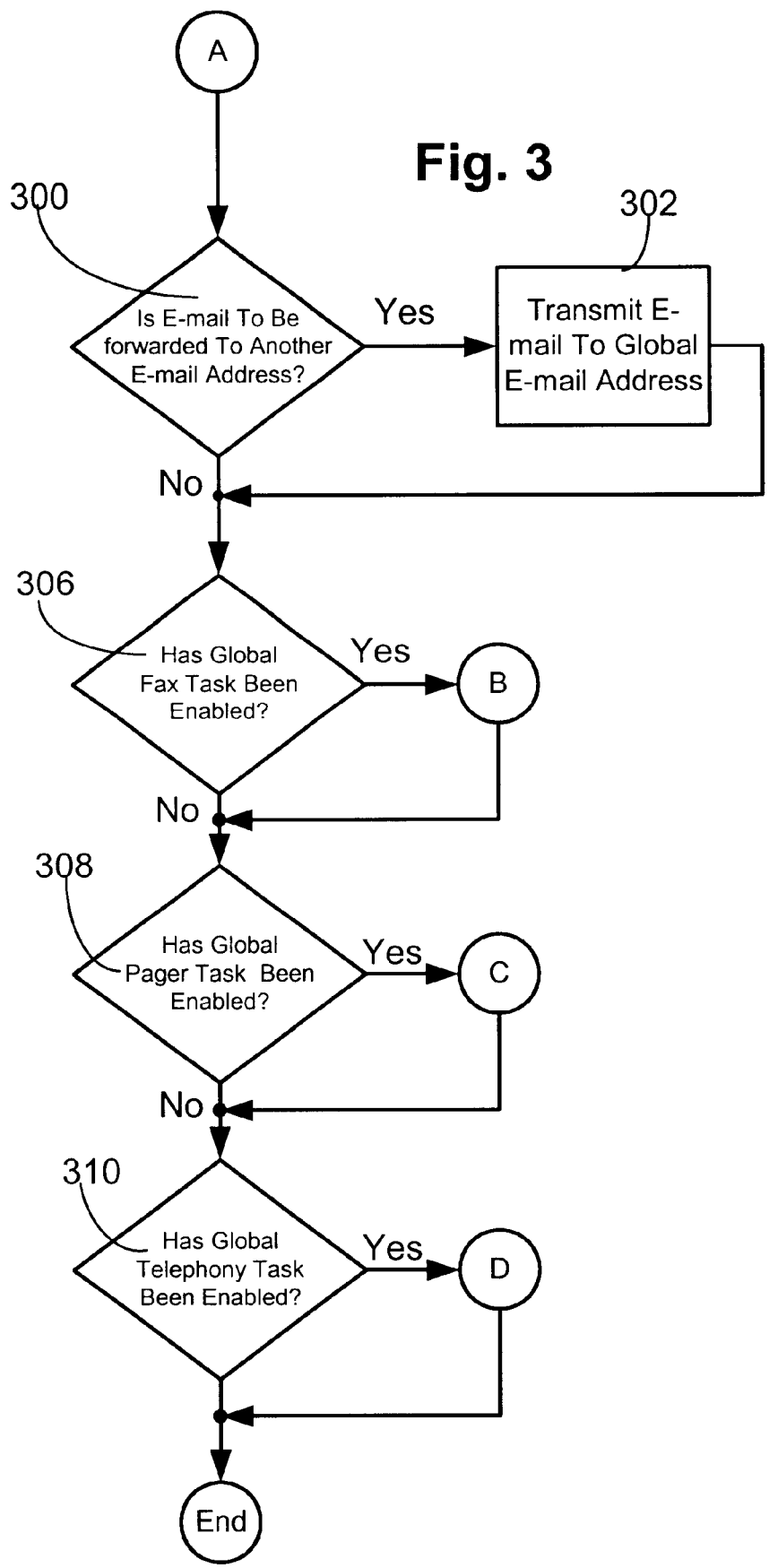

Fig. 10

| Time Period Messaging Tasks | |
|---|---|
| Time Period:<br>8:00am, 12 December 1998<br>to<br>5:00pm, 12 December 1998<br><br>Facsimile Number:<br>123-456-7890<br><br>Pager Number:<br><br><br>Telephone Number:<br><br><br>E-mail Address:<br>LNC31498@Pheasant.com<br><br>Priority and Global Task:<br>Enabled | Time Period:<br>3:00pm, 26 December 1998<br>to<br>11:00am, 31 December 1998<br><br>Facsimile Number:<br>321-123-6789<br><br>Pager Number:<br><br><br>Telephone Number:<br>000-111-2222<br><br>E-mail Address:<br><br><br>Priority and Global Task:<br>Not Enabled |

DYNAMIC E-MAIL RE-TRANSMITTING SYSTEM HAVING TIME PARAMETERS

FIELD OF THE INVENTION

The present invention relates to a programmable electronic messaging system, and more particularly to an internet based messaging server programmable to divert an incoming e-mail message to one of a plurality of different electronic delivery mechanisms based upon messaging tasks as defined for a prescribed time period.

BACKGROUND OF THE INVENTION

As e-mail messaging technology continues to evolve and advance, it is becoming increasingly a more prevalent form of communication. As more and more individuals rely on e-mail as their principle form of communication, it is increasingly becoming important that it's accessibility also continues to evolve.

In the past, e-mail messages were typically transmitted from one computer terminal to another, in which the e-mail message is transmitted from the sender to a recipient, and after being transmitted from the sender, it would typically reside in a messaging server (the e-mail account for the recipient) until such a time as the recipient would access the server to retrieve the recipient's e-mail messages residing in the server. With continuing advancements in communication technology, now not only PC terminals can transmit e-mail messages, but almost any device capable of transmitting electronic data can now both send and retrieve e-mail messages (e.g., cellular telephones, hand-held computer devices having wireless communication capabilities, etc.)

However, eventhough e-mail messages can now be both more easily be sent and retrieved, there are still many instances when an e-mail recipient is not capable of retrieving an e-mail formatted message (e.g., the recipient does not readily have access to an e-mail receiving device). Thus, there still remains a need to improve and expand e-mail accessibility as well as efficiency.

SUMMARY OF THE INVENTION

Accordingly, the present invention relates to a method for re-transmitting an e-mail message transmitted from a sender to a recipient based upon time criteria and preferably other predetermined criteria to enable a recipient to retrieve e-mail messages based upon time criteria for conventionally enabling the recipient to retrieve e-mail messages.

The method includes the steps of defining at least two different sets of criteria to be satisfied in the address block of the e-mail message for initiating messaging tasks wherein each set of criteria has unique associated messaging tasks and prescribing at least one time period for performing time based messaging tasks. A determination is then made for determining if the e-mail message was received within the at least one time period. The e-mail message is re-transmitted in accordance with the defined messaging tasks for the prescribed time period if the e-mail message was determined to be received within the prescribed time period.

Further, the address block of the e-mail message is interrogated to determine if predetermined criteria from at least one of two different sets of criteria has been met in the sender addressing information portion of the e-mail message. And re-transmitting the e-mail message to the recipient such that the recipient receives at least the messaging information content of the e-mail message at a location other than the recipients intended e-mail account in accordance with the messaging tasks associated with one of the two different sets of criteria that has be met in the sender addressing information portion of the e-mail message.

BRIEF DESCRIPTION OF THE DRAWINGS

The above and other objects and advantages of the present invention will become more readily apparent upon consideration of the following detailed description, taken in conjunction with the accompanying drawings, in which like reference characters refer to like parts throughout the drawings and in which:

FIG. 2 is a flow chart depicting the steps taken by messaging server of FIG. 1 for determining if messaging tasks have been enabled;

FIGS. 3–6 are flow charts depicting the steps taken by the messaging server of FIG. 1 for initiating prescribed global messaging tasks;

FIG. 10 is a block diagram depicting the prescribed time period messaging parameters.

DETAILED DESCRIPTION OF THE PREFERRED EMBODIMENT

Figure 1:
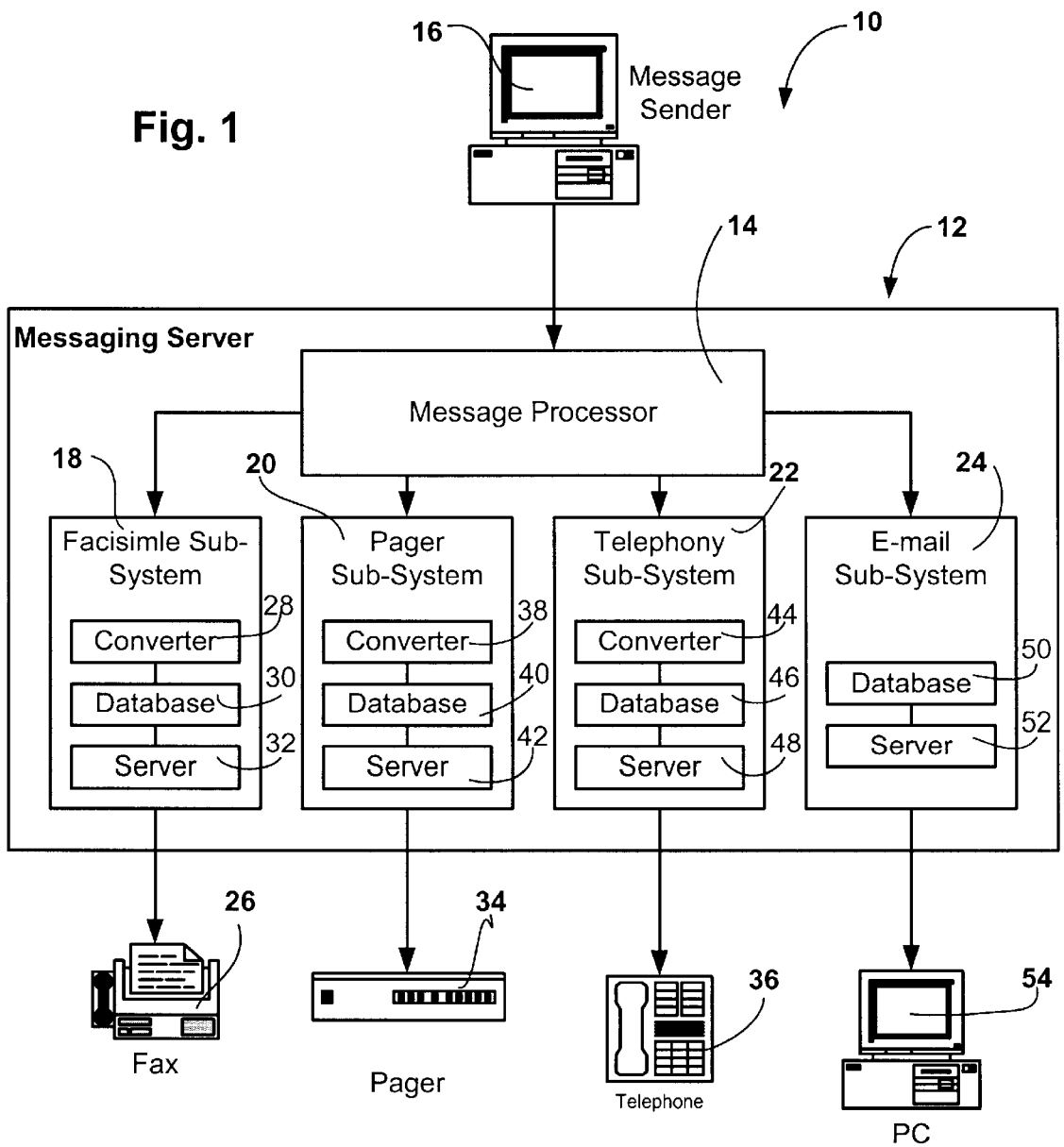
FIG. 1 is a system level block diagram depicting the messaging server embodying the present invention.

With reference to FIG. 1, there is shown in block diagram a messaging system, designated generally at 10, embodying the present invention. Messaging system 10 includes preferably an internet based messaging server 12 having a programmable message processor 14 for initiating the pre-programmed priority and global messaging tasks for subscribing recipients, and for initiating pre-programmed time-based messaging tasks for prescribed time periods. For clarity of illustration, system 10 is shown to include only one PC-based message sender 16, but it is of course to be appreciated that system 10, and more specifically the messaging server 12, is intended to be coupled to a virtual infinite amount of message senders 16, wherein a message sender 16 can be defined as any type of device capable of transmitting an e-mail message to the message server 16, preferably via the internet.

Message server 12 preferably includes a message processor 14 that initiates the below discussed messaging tasks as prescribed by a subscriber. More particularly, message server 12 is preferably an internet based server having a plurality of subscribers, wherein each subscriber is assigned a unique e-mail address, as is well known. For instance, a first subscriber can be assigned the address: nicholls@pb.com, while a second subscriber can be assigned the address: allport@pb.com. As is conventional, the first portion of the exemplary e-mail addresses (i.e., nicholls and allport) are termed user identifications, which is typically chosen by the subscriber. The second portion of the exemplary e-mail addresses (i.e., pb.com) are termed the domain names which is typically fixed for all subscribers on a common message server 12. Without going into elaborate detail, it is this domain name (i.e., pb.com) that is utilized by Domain Name Servers (DNS) on the internet so as to obtain a numerical TCP/IP address, which TCP/IP address is the location in which the messaging server 12 resides on the internet as translated by internet-based Domain Name Servers. As is still conventional, when a sender transmits an e-mail message to an e-mail address (e.g., nicholls@pb.com), that e-mail message is transmitted to and typically maintained within the message server 12 having the matching domain name (pb.com) in a folder or database dedicated to that subscriber recipient (e.g., nicholls). The recipient subscriber, when appropriately logged onto to the message server 12, is then enabled to retrieve the messages delivered to him. Thus, what is described above is well known to all internet-based e-mail message servers.

Described below is the message server 12 in accordance with the present invention which is configured to not only conventionally deliver an e-mail message to a subscriber, but also convert that e-mail message to another chosen format (e.g., facsimile, pager or telephony) and deliver the message in that format based upon predefined criteria chosen by the subscriber. As will be discussed further below, message processor 14 is programmable by the subscriber so as to implement defined messaging tasks in a prescribed time period for a prescribed time period.

For ease of description, a discussion regarding the programming of processor 14 for performing messaging tasks is first given (FIGS. 2–7), which is then followed by a discussion for prescribing time periods (FIG. 8) for time period messaging tasks wherein each prescribed time period has unique priority messaging tasks relative to other prescribed time periods.

Figure 7:
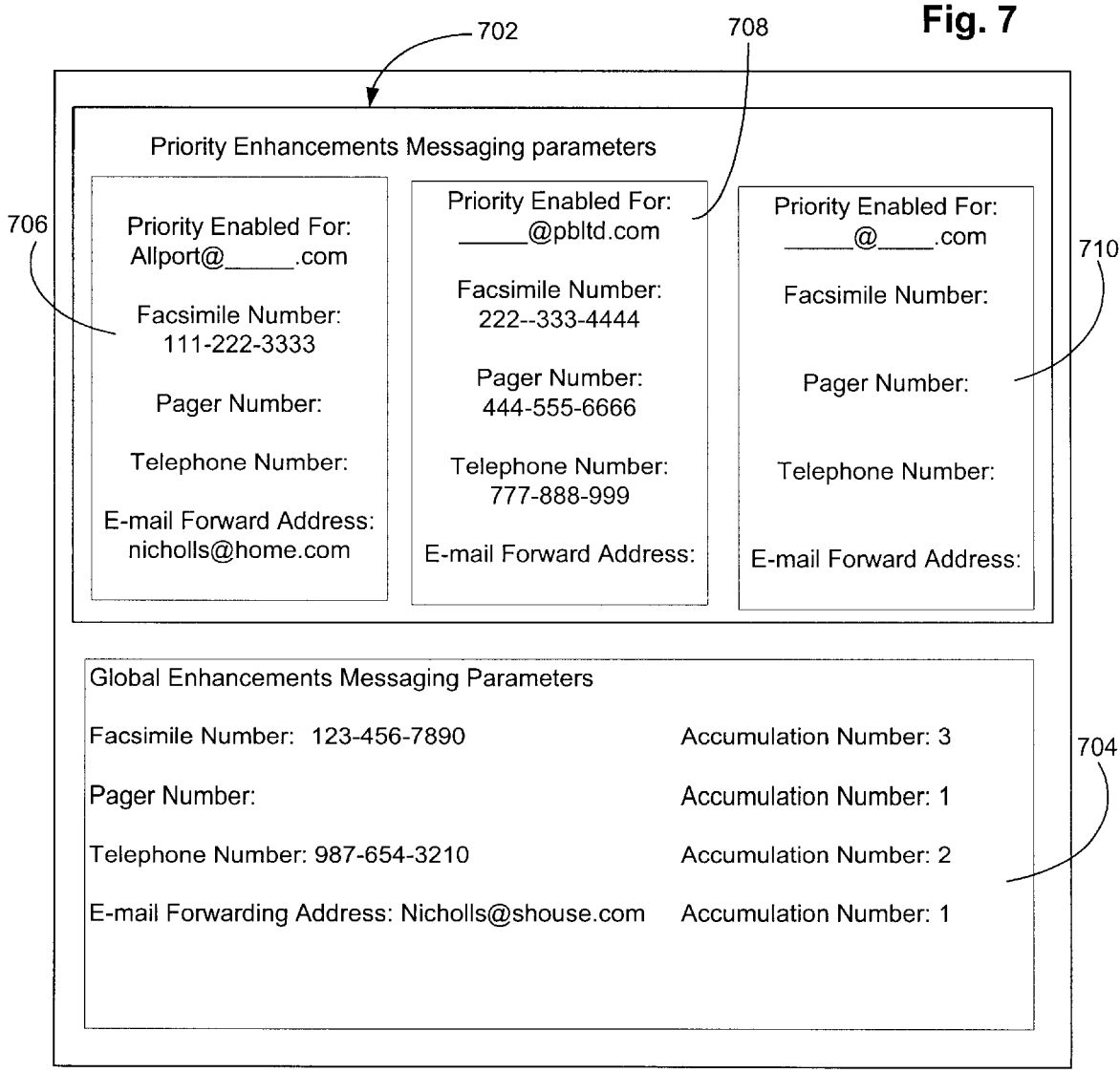
FIG. 7 is a block diagram depicting the prescribed priority and global messaging parameters.

As stated above, messaging server 12 includes a programmable message processor 14, which can be programmable in a number of ways. Preferably, processor 14 is programmed by a subscriber via the internet, wherein the subscriber logs onto an internet page and through access to the subscriber's account file (which of course is preferably password protected), the subscriber inputs the predefined criteria into his account file (FIGS. 7 and 10). The content of this predefined criteria will be readily apparent from the below described operation of messaging server 12. Of course messaging server 12 is not to be understood to be limited to using the internet for its programming, but rather it may be programmed via telephony, facsimile or any other known means for inputting data into a processor.

Message processor 14 is preferably-coupled to: a facsimile sub-system 18, a pager sub-system 20, a telephony sub-system 22 and an e-mail sub-system 24, each of which will be discussed in turn below.

Facsimile sub-system 18 is operational to receive an e-mail message transmitted from a sender 16 to the subscriber recipient and convert and transmit the content of the e-mail message to a predetermined facsimile location 26. Facsimile sub-system 18 includes a converter 28 for converting at least the content of the e-mail message from preferably either HTML or ASCII text to a facsimile format such as "group 3." Further included is preferably a facsimile database 30 coupled to the converter 28 for storing the converted facsimile messages. A facsimile server 32 is coupled to the database 30 and is operational to transmit facsimile messages to a predetermined facsimile location 26. A more detailed explanation of the operation of the facsimile sub-system 18 will be given below in conjunction with the operation of the messaging server 12.

Similarly, both the pager sub-system 20 and telephony sub-system 22 are operational to receive an e-mail message transmitted from a sender 16 to the subscriber recipient and convert and transmit the content of the e-mail message to a predetermined mobile pager location 34 or a telephony location 36, respectively. Regarding the pager sub-system 20, it includes a converter 38 for converting at least the content of the e-mail message from preferably either HTML or ASCII text to a pager format such as alphanumeric characters or ASCII text. Further included is preferably a pager database 40 coupled to the converter 38 for storing converted pager messages. A pager server 42 is coupled to the database 40 and is operational to transmit facsimile messages to a predetermined mobile pager 34.

In regards to the telephony sub-system 22, it similarly includes a converter 44 for converting at least the content of the e-mail message from preferably either HTML or ASCII text to a audio voice message format using preferably known voice recognition techniques. Further included is preferably an audio database 46 coupled to the converter 44 for storing the converted audio voice messages. A telephony server 48 is coupled to the database 46 and is operational to transmit audio voice messages to a predetermined telephony location 36. A more detailed explanation of the operation of both the pager and telephony sub-systems 20 and 22 will also be given below in conjunction with the operation of the messaging server 12.

With regards to the e-mail sub-system 24, it is operational to receive an e-mail message transmitted from a sender 16 to the subscriber recipients e-mail address that is associated with the messaging server 12 (e.g., nicholls@pb.com) and retransmit that message to another predetermined e-mail address (e.g., nicholls@home.com). E-mail sub-system 24 includes an e-mail database 50 for storing the newly addressed-mail messages and is coupled to an e-mail server for transmitting the newly addressed e-mail messages to predetermined e-mail address locations 54. It is to be appreciated that each predetermined e-mail address location 54 includes a device capable or receiving an e-mail message, such as a PC, cellular telephone or hand-held PC-type device.

With the components of the messaging server 12 being described above, it's preferred method of operation will now be discussed. With reference to FIG. 2, and with continued reference to FIG. 1, a sender transmits an e-mail message from the senders location 16 (step 200) to the recipients e-mail address residing in the messaging server 12 (step 202). A determination is then made in the message processor 14 as to whether the recipient has enabled any "messaging tasks" (step 204). As will become apparent below, messaging tasks are defined as converting and/or re-transmitting the E-mail message based upon the subscribers criteria as preprogrammed in the processor 14. If none are enabled, the e-mail message is deposited in an e-mail database 50 corresponding with the e-mail address the message was addressed to (e.g., nicholls@pb.com) (step 206).

If any messaging tasks are enabled, a determination is first made as to whether the recipient has enabled any "time period messaging tasks" for a prescribed time period (step 207) in association with the received e-mail message. Time period messaging tasks are defined as the immediate performance of a chosen messaging task when an e-mail message is received within a prescribed time period. For ease of description, a discussion regarding the time period messaging tasks will be provided further below.

If no time period messaging tasks have been enabled (as will be discussed further below) or if enabled, initiation of a time period messaging task has not disabled the preprogrammed priority and global messaging tasks (as will also be discussed further below), a determination is then made as to whether the recipient has enabled any "Priority Features" (step 208) in association with the received e-mail message. Priority features are defined as the immediate performance of a chosen enhancement feature when an e-mail message is received from a predetermined sender. For example, a subscriber may program the processor 14 to perform a specific task for all e-mail messages having "Allport" appearing in the user identification (e.g. Allport@work.com). Alternatively, a subscriber may program the processor 14 to perform a specific task for all e-mail messages being sent from the domain name "PBltd" (e.g., scottbr@PBltd.com). If priority has not been chosen for the received e-mail message, then it is processed in accordance with the chosen global messaging tasks as described in reference to FIG. 3 (subroutine "A").

Figure 2A:
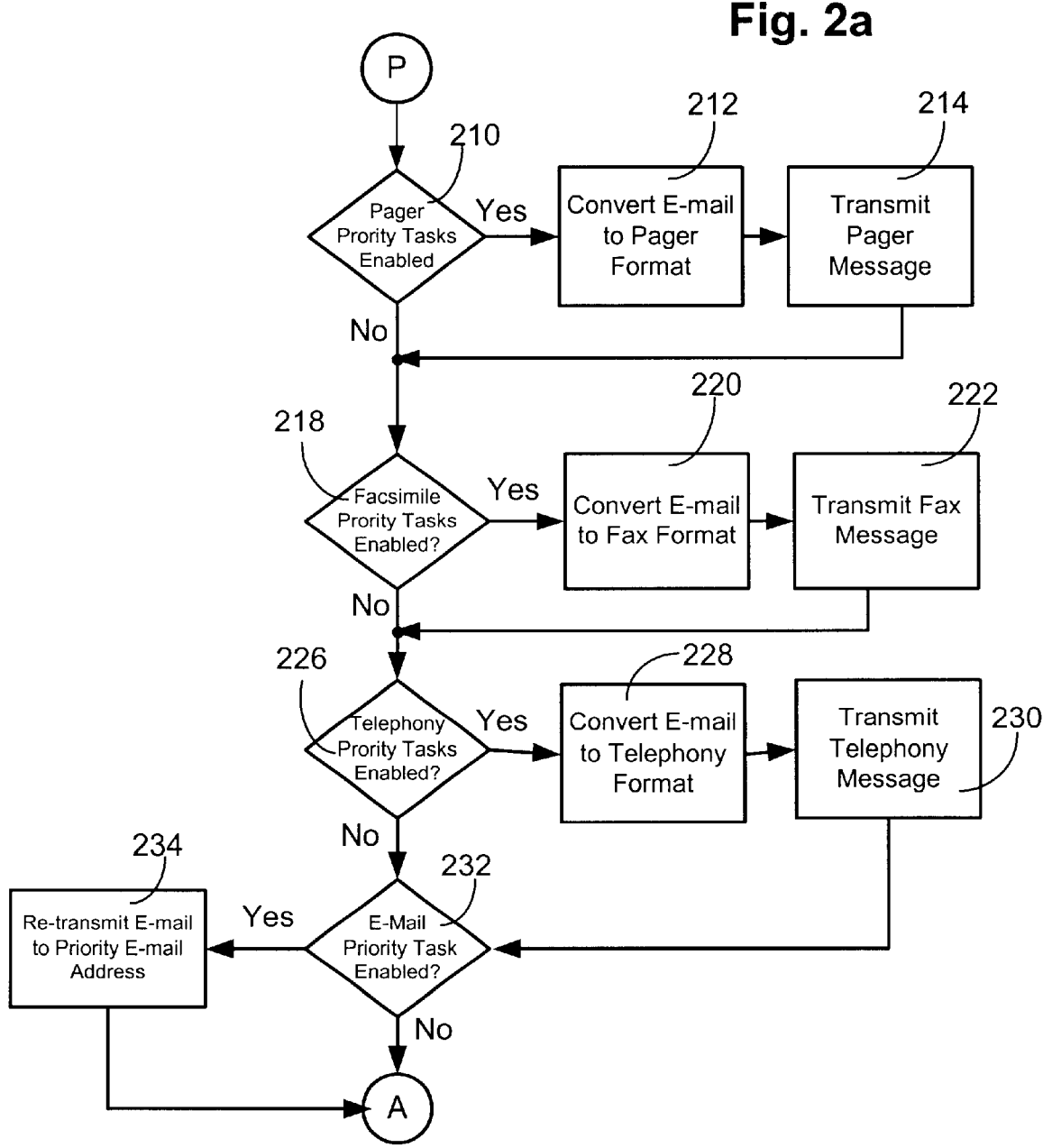
FIG. 2a is a flow chart depicting the steps taken for initiating prescribed priority messaging tasks.
Figure 4:
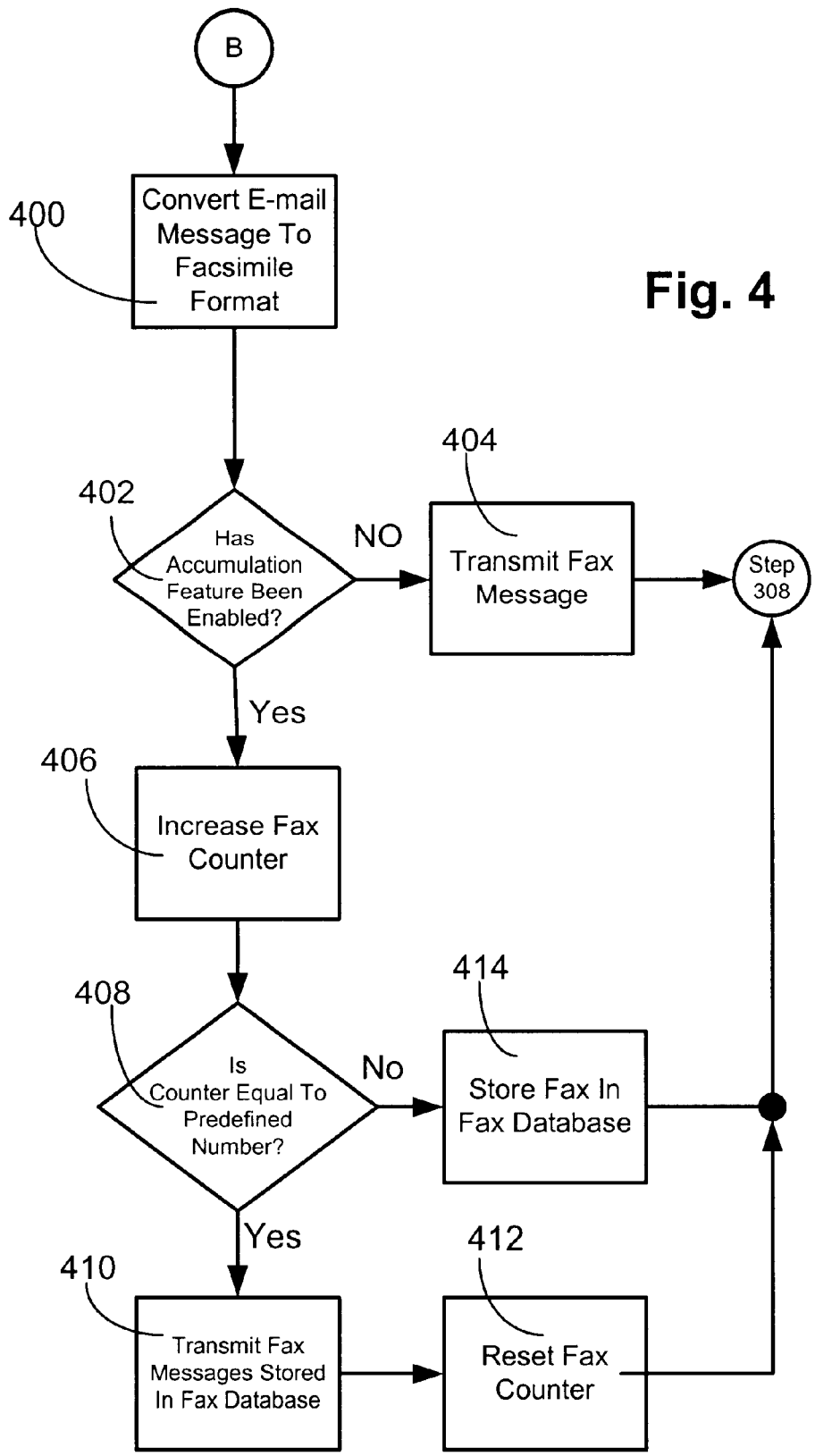
Figure 5:
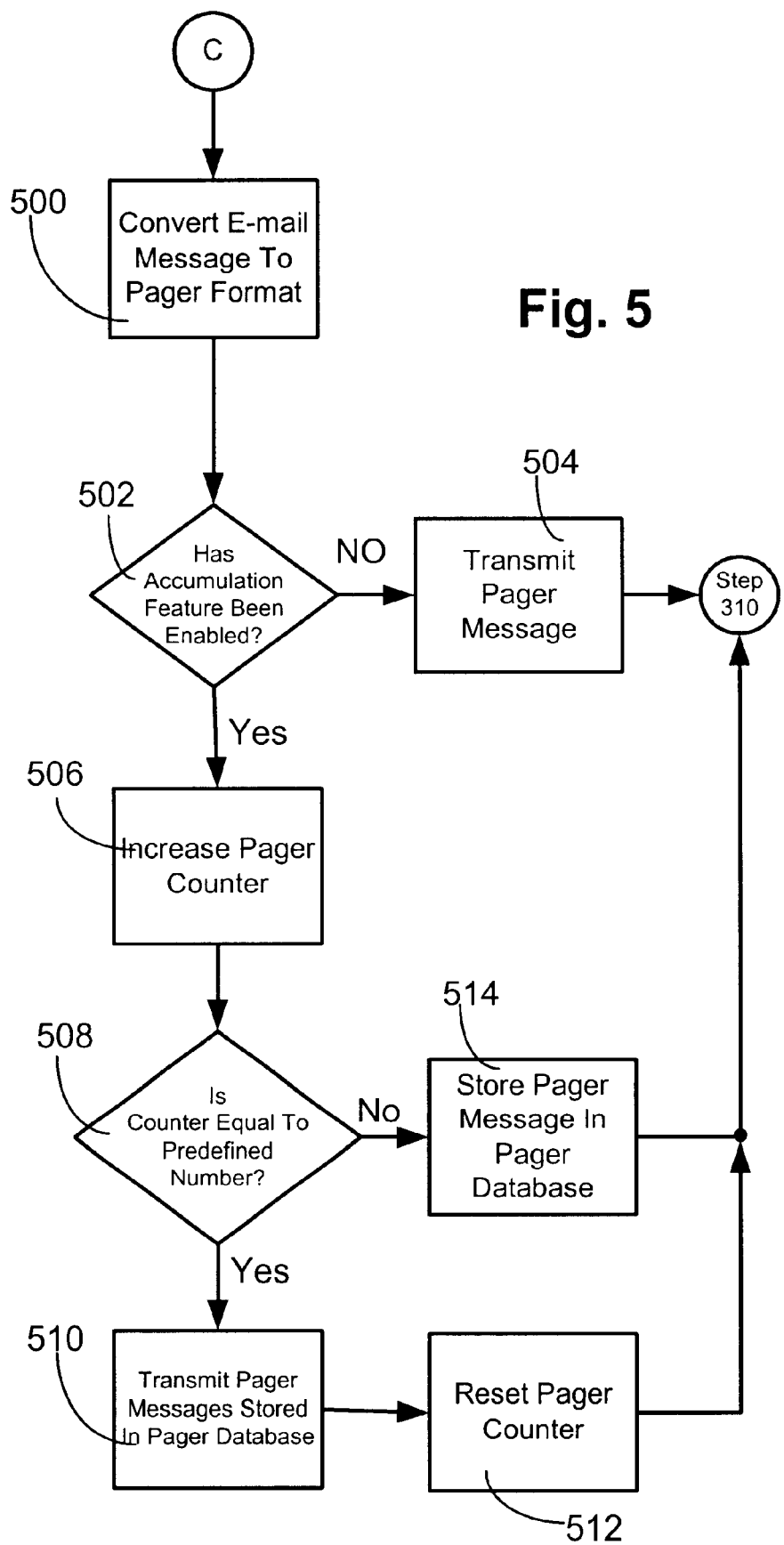
Figure 6:
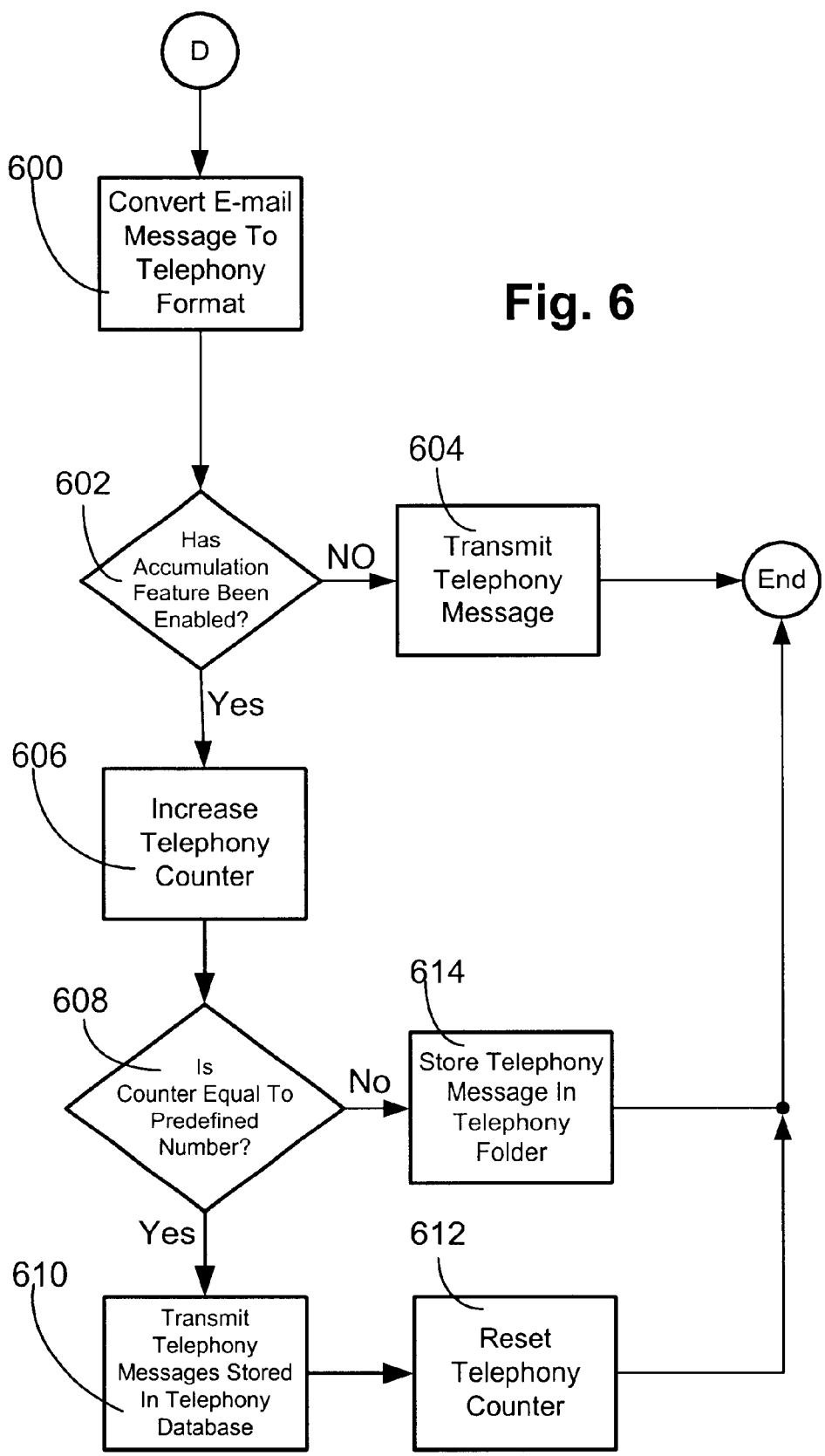

If it is determined that priority has been chosen for the received e-mail message, the determination and performance of the chosen priority messaging task(s) are then initiated as discussed with reference to subroutine "P" of FIG. 2a. Preferably, a determination is first made as to whether a pager feature has been enabled (step 210). If no, the facsimile determination is then made (step 218). If the pager feature has been enabled, then at least the message content of the e-mail message is converted to a pager format by the converter 38 (step 212) in the pager sub-system 20. And that pager message is then transmitted to a predetermined pager 34 (preferably in dependence upon a selected telephone number that corresponds to a chosen pager), via pager server 42 (step 214).

If the pager priority task was not enabled for the received e-mail message (step 210), or after initiation of the pager priority messaging tasks (steps 212 and 214), a determination is then made as whether the facsimile priority messaging tasks has been enabled for the received e-mail message (step 218). If no, the telephony determination is then made (step 226). If the facsimile priority messaging task has been enabled, then at least the message content of the e-mail message is converted to a facsimile format by the converter 28 (step 220) in the facsimile sub-system 18. And that facsimile message is then transmitted to a predetermined facsimile device 26 (preferably in dependence upon a selected telephone number that corresponds to a chosen facsimile device), via facsimile server 32 (step 222).

If the facsimile priority messaging task was not enabled for the received e-mail message (step 218), or after initiation of the facsimile priority messaging tasks (steps 220 and 222), a determination is then made as whether the telephony priority messaging tasks has been enabled for the received e-mail message (step 226). If yes, then at least the message content of the e-mail message is converted to an audio format by the voice recognition converter 44 (step 228) in the telephony sub-system 22. And that audio message is then transmitted to a predetermined telephone location 36 (preferably in dependence upon a selected telephone number that corresponds to a chosen device having the capability to broadcast the audio message such as a conventional telephone or properly configured PC), via telephony server 48 (step 230). A determination is then made as to whether the e-mail priority messaging task has also been chosen for the received e-mail message (step 232).

If the telephony priority messaging task was not enabled for the received e-mail message (step 226) and/or the e-mail priority messaging task has additionally been chosen for the received e-mail message (232), then at least the messaging content of the received e-mail message is re-transmitted to another e-mail address as determined by the subscriber (step 234). The above priority feature then terminates in regards to the present received e-mail, and is again initiated upon receipt of another e-mail message if the predetermined priority criteria has been satisfied. In regards to the present e-mail message, it is then processed in accordance with the pre-programmed global messaging tasks as discussed in reference to subroutine "A" of FIG. 3. It is to be appreciated that if the above-described priority feature is initiated for another received e-mail message, the priority messaging parameters need not be the same, as will be discussed further below.

For example, and with reference to FIG. 7, a subscriber (i.e., nicholls@pb.com) can program the processor 400, in regards to the aforesaid priority messaging parameters (block 702) differently for messages received having the user identification name "allport" compared to messages received having the domain name "pbltd." Thus, if a message is sent to the subscriber (i.e., nicholls@pb.com) from allport@home.com then the message portion of the received e-mail may be faxed to the subscriber's home facsimile machine (e.g., 111-222-3333) and retransmitted to the subscribers home address (i.e., nicholls@home.com) (block 706). In comparison, if a message is sent to the subscriber (i.e., nicholls@pb.com) from scottbr@pbltd.com then the message portion of the received e-mail may be faxed to the subscriber's work facsimile machine (e.g., 222-333-4444) and transmitted to the subscribers pager (e.g., 444-555-6666) as well as the subscribers home telephone number (e.g., 777-888-9999) (block 708). In the event that an e-mail message is received from a sender meeting two different preprogrammed criteria allport@pbltd.com, each having their own priority messaging parameters, then the priority messaging task of FIG. 2 defaults to the parameters that correspond to the user identification (block 706). And of course if the sender information associated with a received e-mail message meets none of the aforementioned preprogrammed priority criteria (e.g., house@work .com) then that e-mail message is then sent to the global messaging tasks program (step 208), as explained below with reference to subroutine "A" of FIG. 3. It is thus to be appreciated that a plurality of different priority criteria can be preprogrammed into processor 14, each having unique messaging parameters.

If the received e-mail message does not satisfy any of the programmed priority messaging parameters, or the priority feature has not been enabled (step 208), the received e-mail message is then processed in accordance with the global messaging tasks as shown in subroutine "A" of FIG. 3. Like the above-described priority messaging tasks, the global messaging tasks are operational to also convert and/or re-transmit the received e-mail message to another location (s), other then the intended location. But unlike the priority messaging tasks of FIG. 2a, the global messaging tasks do not distinguish between received e-mail messages for determining what preprogrammed messaging tasks are to be initiated. For instance, if the facsimile feature has been enabled, then all received e-mail messages are transmitted to a common facsimile location.

With reference to FIG. 3, processor 14 (FIG. 1) first determines if the received e-mail message is to be transmitted to another e-mail address (step 300). If yes, then at least the messaging content of the received e-mail message is re-transmitted to another e-mail address, via e-mail server 52, as determined by the subscriber (step 302) and as pre-preprogrammed in accordance with the global messaging tasks. A determination is then made as to whether the global facsimile feature has been enabled (step 306).

If the e-mail global feature is not enabled (step 300) or after the e-mail feature has been initiated (step 302), a determination is then made as to whether the global facsimile feature has been enabled (step 306). If yes, and with reference to subroutine "B" of FIG. 4, the e-mail message is then converted to a facsimile format, via facsimile converter 28 (step 400). A determination is then made as to whether the facsimile accumulation feature has been enabled (step 402). If no, then the facsimile formatted message is transmitted to a predetermined facsimile location as pre-programmed by the subscriber, via facsimile server 32 (step 404).

If the facsimile accumulation feature has been enabled (step 402) then a facsimile counter is increased by one increment (step 406), preferably in processor 14, and a determination is then made as to whether the present facsimile counter equals a predefined facsimile counter number (step 408). This facsimile counter number is predefined by the subscriber and corresponds to the number of facsimile formatted messages that must be collected before they are all successively transmitted to the predetermined facsimile location 26. If the present facsimile counter number equals the predefined facsimile counter number, then all the facsimile formatted messages stored in the facsimile database 30 are transmitted to a predetermined facsimile location 26 as pre-programmed by the subscriber, via facsimile server 32 (step 410). The present facsimile counter is then reset to zero and all facsimile formatted messages contained in the facsimile database 30 are preferably deleted (step 412). If the present facsimile counter number does not equals the predefined facsimile counter number (step 408), then the facsimile formatted message is stored in the facsimile database 30 (step 414) and these stored messages are not transmitted until the number of stored messages equals the predefined facsimile counter number.

Returning reference to FIG. 3, if the facsimile global messaging task was not enabled (step 306) or after the facsimile messaging task has been initiated (subroutine "B"), a determination is then made as to whether the global pager messaging task has been enabled (step 308). If yes, and with reference to subroutine "C" of FIG. 5, the e-mail message is then converted to a pager format, via pager converter 38 (step 500). A determination is then made as to whether the pager accumulation feature has been enabled (step 502). If no, then the page formatted message is transmitted to a predetermined pager 34 as pre-programmed by the subscriber, via pager server 42 (step 504).

If the pager accumulation feature has been enabled (step 502) then a pager counter is increased by one increment (step 506), preferably in processor 14, and a determination is then made as to whether the present pager counter equals a predefined pager counter number (step 508). This pager counter number is predefined by the subscriber and corresponds to the number of pager formatted messages that must be collected before they are all successively transmitted to the predetermined pager. If the present pager counter number equals the predefined pager counter number, then all the pager formatted messages stored in the pager database 40 are transmitted to a predetermined pager 34 as pre-programmed by the subscriber, via pager server 42 (step 510). The present pager counter is then reset to zero and all pager formatted messages contained in the pager database 40 are preferably deleted (step 512). If the present pager counter number does not equal the predefined pager counter number (step 508), then the pager formatted message is stored in the pager database 40 (step 514) and these stored messages are not transmitted until the number of stored messages equals the predefined pager counter number.

Again with returning reference to FIG. 3, if the global pager messaging task was not enabled (step 308) or after the global pager messaging task has been initiated (subroutine "C"), a determination is then made as to whether the global telephony messaging task has been enabled (step 310). If yes, and with reference to subroutine "D" of FIG. 6, the e-mail message is then converted to a telephony format, via telephony converter 44 (step 600). A determination is then made as to whether the telephony accumulation feature has been enabled (step 602). If no, then the telephony formatted message is transmitted to a predetermined telephone location 36 as pre-programmed by the subscriber, via telephony server 48 (step 604).

If the telephony accumulation feature has been enabled (step 602) then a telephony counter is increased by one increment (step 606), preferably in processor 14, and a determination is then made as to whether the present telephony counter equals a predefined telephony counter number (step 608). This telephony counter number is predefined by the subscriber and corresponds to the number of telephony formatted messages that must be collected before they are all successively transmitted to the predetermined telephone location 36. If the present telephony counter number equals the predefined telephony counter number, then all the telephony formatted messages stored in the telephony database 46 are transmitted to a predetermined telephone as pre-programmed in accordance with the global enhancement features, via telephony server 48 (step 610). The present telephony counter is then reset to zero and all telephony formatted messages contained in the telephony database 46 are preferably deleted (step 612). If the present telephony counter number does not equal the predefined telephony counter number (step 608), then the telephony formatted message is stored in the telephony database 46 (step 614) and these stored messages are not transmitted until the number of stored messages equals the predefined telephony counter number.

It is to be appreciated that the pre-programmed messaging parameters for the aforesaid global messaging tasks can be either the same or different than those for the priority messaging tasks as discussed above with reference to FIG. 2a. To illustrate this, reference is again made to FIG. 7, which depicts the pre-programmed messaging parameters, as chosen by a subscriber and retained in the processor 14 of the messaging server 12. In continuance of the exemplary scenario described above with reference to the priority messaging parameters (block 702), discussion will now be given in regards to the pre-programmed global enhancements messaging parameters (block 704). With the priority messaging parameters remaining the same as shown in FIG. 7 and discussed above (block 702), a subscriber can program the processor 14 with the following global enhancements messaging parameters (block 704):

(1) all received e-mail messages are to be faxed to the subscribers summer home facsimile number (i.e., 123-456-7890) after three messages have accumulated in the facsimile database 30;

(2) all received e-mail messages are to be telephoned in audio format to the subscribers summer home facsimile number (i.e., 987-654-3210) after two messages have accumulated in the telephony database 30; and (3) all received e-mail messages are to be e-mailed to the subscribers summer home e-mail address (i.e., Nicholls@shouse.com).

For instance, if an e-mail message is received from Allport@work.com, then the messaging parameters of priority messaging routine of block 706 are performed in addition to those of the aforesaid global messaging routine, block 704. Alternatively, if an e-mail message is received from scottsu@pbltd.com the messaging parameters of priority messaging routine of block 708 are performed in addition to those of the aforesaid global messaging routine, block 704. And further, if an e-mail message is received from Cookgr@play.com then no priority messaging steps are taken (since the received message does not satisfied any of the pre-programmed criteria (block 702), but the global messaging features of the pre-programmed global messaging routine (block 704) are nevertheless performed (since there is no criteria to satisfy).

With the messaging operations for performing the pre-defined priority and global messaging tasks being described above (FIGS. 2–7), discussion will now turn toward performing predefined time period messaging tasks if it is determined that the time period messaging tasks have been enabled (step 207, FIG. 2). As will be appreciated from the below discussion, messaging server 12 is preferably configured to enable a subscriber to define prescribed time periods, wherein each prescribed time period has unique priority messaging tasks associated with it.

Figure 8:
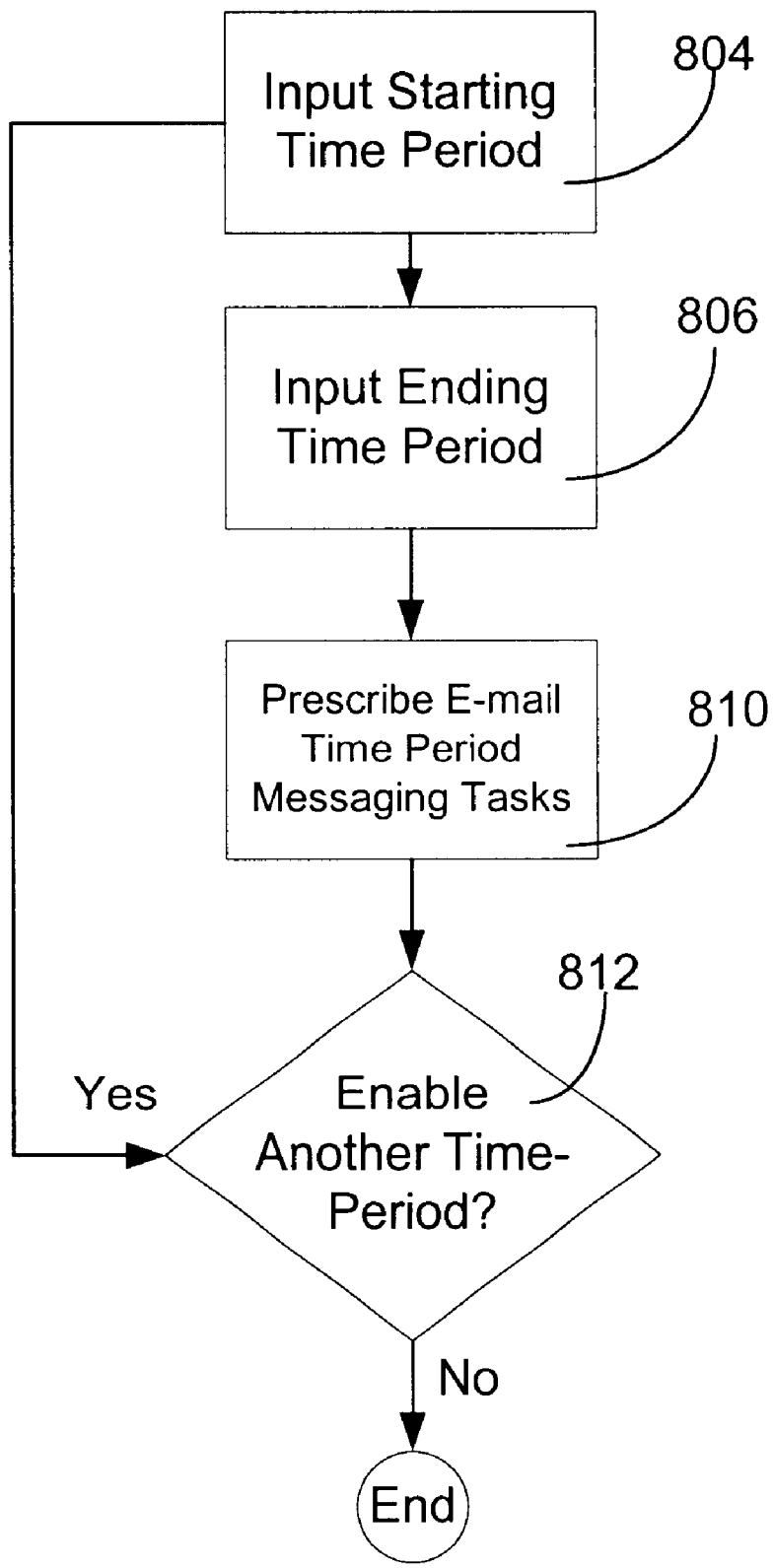
FIG. 8 is a flow chart depicting the steps taken to program priority messaging tasks for prescribed time periods.

With reference to FIG. 8, the steps taken for programming the messaging server to perform time period messaging tasks will now be discussed. The subscriber inputs the starting time defining the first time period (step 804) (e.g., 8:00am, Dec. 12, 1998) as well as the ending time (step 806) for the first time period (e.g., 5:00pm, Dec. 12, 1998). The priority messaging tasks for that time period are then programmed into processor 14 (810) and initiation thereof will be discussed further below in reference to subroutine "T" of FIG. 9. It is to be understood that steps for prescribing these priority messaging tasks are to be the same as was performed in regards to the priority and global messaging tasks as discussed above in reference to FIGS. 2–6. A determination is then made as to whether another prescribed time period is to be defined (step 812). If yes, then the subscriber inputs the starting time defining a second time period (step 804) (e.g., 3:00pm, Dec. 26, 1998) as well as the ending time (step 806) for the first time period (e.g., 11:00am, Dec. 31, 1998). The priority messaging tasks for that time period are then prescribed (step 810) which priority messaging tasks are unique relative to those prescribed for the first time period.

Figure 9:
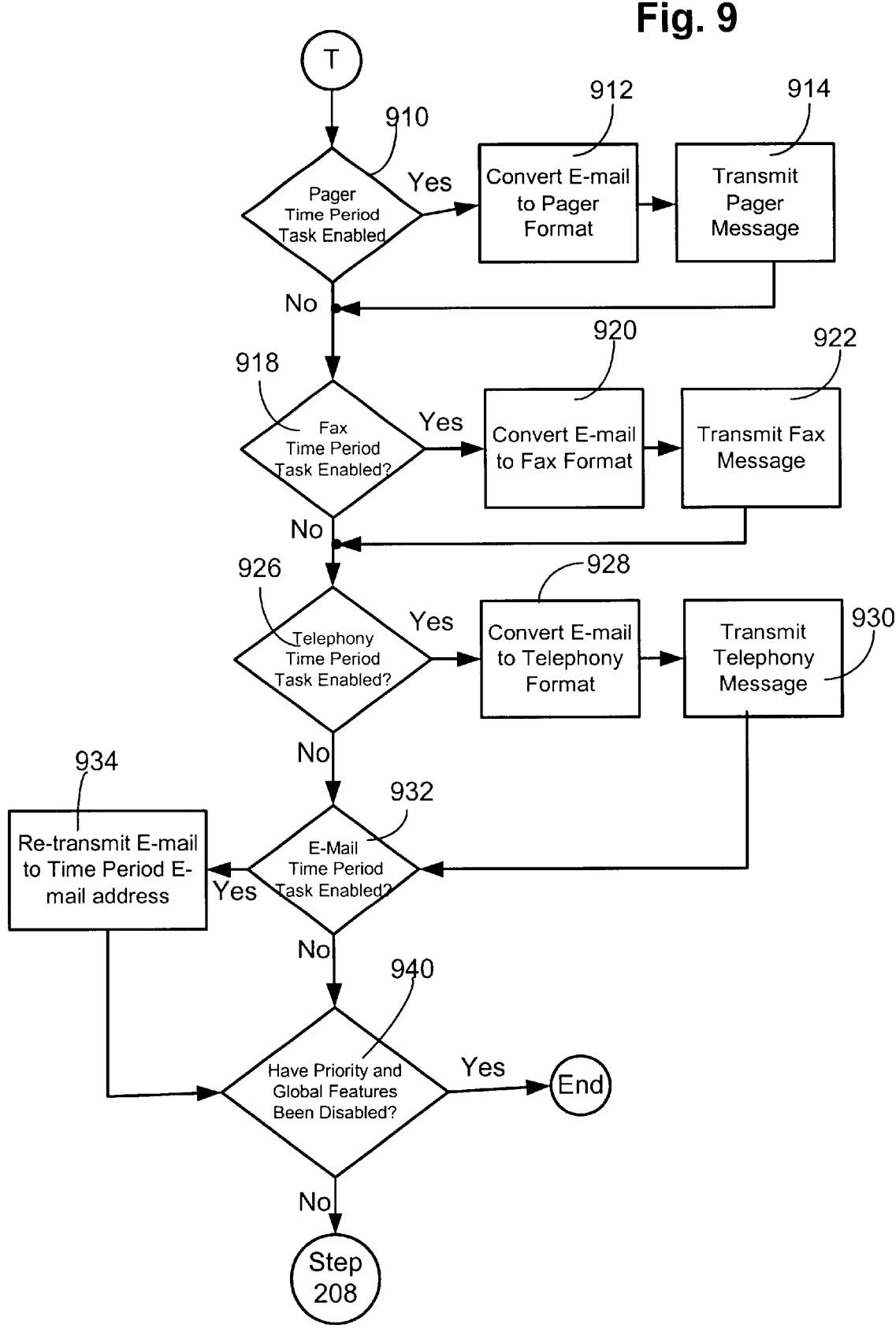
FIG. 9 is a flow chart depicting the steps taken by the messaging server of FIG. 1 for initiating prescribed time period messaging tasks.

In operation and with reference to FIGS. 2 and 9, when an e-mail message is received in the messaging server 12 from a sender (step 202) and it has been determined that e-mail messaging tasks have been enabled in the messaging server 12 (step 204), a determination is then made as to whether a time period messaging task has been enabled for the time period the e-mail message was received (e.g., 9:00am, Dec. 12, 1998) (step 207). If yes, then the time period messaging tasks of subroutine "T" of FIG. 9 are initiated.

With reference to FIG. 9, preferably a determination is first made as to whether a pager messaging task has been enabled (step 910). If no, the facsimile determination is then made (step 918). If the pager messaging task has been enabled, then at least the message content of the e-mail message is converted to a pager format by the converter 38 (step 912) in the pager sub-system 20. And that pager message is then transmitted to a predetermined pager 34 as pre-programmed by the subscriber, via pager server 42 (step 914).

If the pager time period messaging task was not enabled (step 910), or after initiation of the pager time period messaging tasks (steps 912 and 914), a determination is then made as whether the facsimile time period messaging task has been enabled (step 918). If no, the telephony determination is then made (step 926).

If the facsimile messaging task has been enabled, then at least the message content of the e-mail message is converted to a facsimile format by the converter 28 (step 920) in the facsimile sub-system 18. And that facsimile message is then transmitted to a predetermined facsimile device 26, via facsimile server 32 (step 922).

If the facsimile time period messaging task was not enabled (step 918), or after initiation of the facsimile time period messaging tasks (steps 920 and 922), a determination is then made as whether the telephony time period messaging tasks has been enabled (step 926). If yes, then at least the message content of the e-mail message is converted to an audio format by the voice recognition converter 44 (step 928) in the telephony sub-system 22. And that audio message is then transmitted to a predetermined telephone location 36.

If the telephony time period messaging task (step 926) was not enabled, or after initiation of the telephony time period messaging tasks (steps 928 and 930) a determination is then made as to whether an e-mail time period messaging tasks has also been enabled (step 932). If yes, then at least the messaging content of the received e-mail message is re-transmitted to another e-mail address as prescribed in the time period messaging tasks for the present initiated time period, via e-mail server 52 (step 934).

If the e-mail time period messaging task (step 932) was not enabled, or after initiation of the e-mail time period messaging task (step 934), a determination is then made as to whether the aforesaid prescribed priority and global messaging have been disabled for the present time period (step 940). If yes, none of the prescribed priority and/or global messaging tasks are initiated in regards to that e-mail message, and the messaging server awaits the receipt of another e-mail message (step 202). If the prescribed priority and/or global messaging tasks have not been disabled (step 940), then the e-mail message is processed in accordance with priority and global messaging tasks, as discussed above, starting at step 208 of FIG. 2.

With the method for performing the priority, global and prescribed time period messaging tasks being discussed above, exemplary operation of the messaging server 12 regarding those messaging tasks will now be given in reference to the prescribed time period messaging tasks of FIG. 10.

It is to be understood that for the present example, the priority and global messaging tasks as set forth in FIG. 7 are to be the prescribed priority and global messaging parameters. With reference to FIG. 10, there is shown two time periods being prescribed, each having unique time period messaging tasks. In this example, a first time period is prescribed between 8:00am, Dec. 12, 1998 to 3:00pm, Dec. 12, 1998, and a second time period is prescribed between 3:00pm, Dec. 26, 1998 to 11:00am, Dec. 31, 1998.

Therefore, if an e-mail message intended for the subscriber is received within the first time period (e.g. 1:30pm, Dec. 12, 1998) then that e-mail is faxed to a facsimile device at telephone number: 123-456-7890, is e-mailed to LNC31498@75phesant.com, and the prescribed priority and global messaging tasks of FIG. 7 are also initiated. If an e-mail message is received within the second time period (e.g., 6:00am, Dec. 28, 1998) then that e-mail message is faxed to a facsimile device at telephone number: 321-111-6789, is sent in audio format to telephone number: 000-111-2222, but in regards to the prescribed priority and global messaging tasks of FIG. 7, they are not initiated for this e-mail message since they were not enabled in this time period. And of course, if an e-mail message is received at a time not within either the prescribed first or second time period (e.g., 4:20pm Dec. 17, 1998) then neither of the messaging tasks of the first and second prescribed time periods are initiated, but rather the prescribed messaging tasks for the priority and global messaging tasks are initiated, as discussed above.

In summary, an internet based e-mail system has been described for providing dynamic messaging capabilities for e-mail messages received in regards to subscribers of the e-mail system. Although the present invention has been described with emphasis on a particular embodiment, it should be understood that the figures are for illustration of the exemplary embodiment of the invention and should not be taken as limitations or thought to be the only means of carrying out the invention. Further, it is contemplated that many changes and modifications may be made to the invention without departing from the scope and spirit of the invention as disclosed.

What is claimed is:

1. A method for re-transmitting an e-mail message transmitted from a sender to a recipient based upon predetermined criteria, the method comprising the steps of:

prescribing at least one time period for performing messaging tasks;

defining messaging tasks to be initiated for said e-mail message during said at least one time period;

receiving in a recipients e-mail account said e-mail message transmitted from said sender;

determining if said e-mail message was received within said at least one time period;

converting at least the messaging information content of the e-mail message to a predetermined communication format chosen from the group consisting of telephony format and facsimile format; and re-transmitting said converted e-mail message such that it is received at a recipients location in the predetermined format in accordance with said defined messaging tasks for said time period if said e-mail message was determined to be received within said time period.

2. A method as recited in claim 1 wherein the re-transmitting step includes re-transmitting the e-mail message to an e-mail account other than the recipients intended e-mail account.

3. A method as recited in claim 1 wherein in the re-transmitting step at least the messaging information content of the e-mail message is converted to at least two different communication formats other than e-mail format.

4. A method as recited in claim 1, further including the steps of:

interrogating an address block of said e-mail message to determine if predetermined criteria has been met in a sender addressing information portion of said e-mail message; and re-transmitting the e-mail message to said recipient such that said recipient receives at least a messaging information portion of said e-mail message at a location other than said recipients intended e-mail account if said predetermined criteria has been met in said sender addressing information portion of said e-mail message.

5. A method for re-transmitting an e-mail message transmitted from a sender to a recipient based upon predetermined criteria, the e-mail message including a message block having messaging information and an address block identifying both recipient and sender addressing information, the method comprising the steps of:

providing a storage medium;

receiving in a recipients intended e-mail account location an e-mail message transmitted from a sender;

prescribing at least one time period for performing messaging tasks;

defining messaging tasks to be initiated for said e-mail message during said at least one time period;

determining if said e-mail message was received within said at least one time period;

re-transmitting said e-mail message in accordance with said defined messaging tasks for said time period if said e-mail message was determined to be received within said time period;

converting at least the messaging information content of the e-mail message to a predetermined communication format chosen from the group consisting of telephony format and facsimile format;

storing the converted e-mail message in the storage medium;

transmitting all converted e-mail messages stored in the storage medium so as to be received by a recipient in the predetermined communication format at a location other than the recipients intended e-mail account when a predetermined number of converted e-mail messages having been stored in the storage medium.

6. A method for re-transmitting an e-mail message transmitted from a sender to recipient based upon predetermined criteria, the e-mail message including a message block having messaging information and an address block identifying both recipient and sender addressing information, the method comprising the steps of:

providing a plurality of storage mediums;

receiving in a recipients intended e-mail account location an e-mail message transmitted from a sender;

prescribing at least one time period for performing messaging tasks;

defining messaging tasks to be initiated for said e-mail message during said at least one time period;

determining if said e-mail message was received within said at least one time period;

re-transmitting said e-mail message in accordance with said defined messaging tasks for said time period if said e-mail message was determined to be received within said time period;

converting at least the messaging information content of the e-mail message to one of a plurality of predetermined communication formats chosen from the group consisting of telephony format and facsimile format;

storing each converted e-mail message in one of a plurality of storage mediums wherein each storage medium contains converted e-mail messages of a like communication format; and transmitting all converted e-mail messages stored in one of the plurality of storage mediums so as to be received by a recipient in the predetermined communication format at a location other than the recipients intended e-mail account when a predetermined number of converted messages have been stored in the one of the plurality of storage mediums.

7. A method as recited in claim 6 further including the step of deleting the e-mail message from the recipients intended e-mail account without user intervention.

8. A method for re-transmitting an e-mail message transmitted from a sender to a recipient based upon predetermined criteria, the e-mail message including a message block having messaging information and an address block identifying both recipient and sender addressing information, the method comprising the steps of:

defining at least two different sets of criteria to be satisfied in the address block of the e-mail message for initiating messaging tasks wherein each set of criteria has unique associated messaging tasks;

receiving in a recipients intended e-mail account location an e-mail message transmitted from a sender;

prescribing at least one time period for performing messaging tasks;

defining messaging tasks to be initiated for said e-mail message during said at least one time period;

determining if said e-mail message was received within said at least one time period;

converting at least the messaging information content of the e-mail message to a predetermined communication format chosen from the group consisting of telephony format and facsimile format;

re-transmitting said converted e-mail message such that it is received at a recipients location in the predetermined format in accordance with said defined messaging tasks for said time period if said e-mail message was determined to be received within said time period;

interrogating the address block of the e-mail message to determine if predetermined criteria from at least one of said two different sets of criteria has been met in the sender addressing information portion of the e-mail message; and re-transmitting the e-mail message to the recipient such that the recipient receives at least the messaging information content of the e-mail message at a location other than the recipients intended e-mail account in accordance with the messaging tasks associated with one of the said two different sets of criteria that has be met in the sender addressing information portion of the e-mail message.

9. A method as recited in claim 8 wherein the re-transmitting step includes re-transmitting the e-mail message to an e-mail account other than the recipients intended e-mail account.

10. A method as recited in claim 8 further including the step of deleting the e-mail message from the recipients intended e-mail account without user intervention if the predetermined criteria from one of the different sets of criteria has been met.

* * * * *